(12) United States Patent
Sharma (10) Patent No.: US 11,149,408 B2
(45) Date of Patent: Oct. 19, 2021

(54) DETECTION OF UNINTENDED DIRECTIONAL MOVEMENT OF AN ARTICULATED IMPLEMENT OF A MACHINE

(71) Applicant: Caterpillar Inc., Deerfield, IL (US)

(72) Inventor: Amit Sharma, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 302 days.

(21) Appl. No.: 16/263,465

(22) Filed: Jan. 31, 2019

(65) Prior Publication Data

US 2020/0248433 A1 Aug. 6, 2020

(51) Int. Cl.
*E02F 9/20* (2006.01)
*E02F 3/76* (2006.01)
*E02F 9/08* (2006.01)
*E02F 9/26* (2006.01)

(52) U.S. Cl.
CPC ............ *E02F 9/2029* (2013.01); *E02F 3/764* (2013.01); *E02F 9/0841* (2013.01); *E02F 9/2037* (2013.01); *E02F 9/2087* (2013.01); *E02F 9/265* (2013.01)

(58) Field of Classification Search
CPC ................................ E02F 9/2029; E02F 3/764
See application file for complete search history.

(56) References Cited

U.S. PATENT DOCUMENTS

| 4,616,841 | A | 10/1986 | Reichl et al. |
| 4,763,916 | A | 8/1988 | Ratsko et al. |
| 5,152,544 | A | 10/1992 | Dierker, Jr. et al. |
| 8,548,680 | B2 | 10/2013 | Ryerson et al. |
| 2006/0204347 | A1* | 9/2006 | Waldbauer ............... B60T 7/20 410/156 |
| 2008/0208424 | A1 | 8/2008 | Hartman |
| 2013/0299266 | A1* | 11/2013 | Ho ........................ F15B 11/006 180/271 |
| 2015/0165850 | A1* | 6/2015 | Chiu ....................... B60D 1/62 701/41 |
| 2015/0353096 | A1* | 12/2015 | Baust .................... B60W 10/20 701/41 |
| 2016/0002885 | A1 | 1/2016 | Sharma et al. |
| 2016/0114831 | A1 | 4/2016 | Laine |
| 2017/0055918 | A1* | 3/2017 | Hughes ............. A63B 24/0003 |
| 2017/0114525 | A1* | 4/2017 | Rosa Neto ............ E02F 9/2253 |

FOREIGN PATENT DOCUMENTS

| EP | 0435086 B1 | 5/1995 |
| EP | 2542463 | 1/2013 |
| GB | 1551116 | 8/1979 |

* cited by examiner

*Primary Examiner* — Jess Whittington
(74) *Attorney, Agent, or Firm* — Harrity & Harrity LLP (57) ABSTRACT

A motor grader is disclosed. The motor grader may include an articulated implement. The motor grader may include an articulation control device. The articulation control device may be configured to determine that articulation motion of the articulated implement is occurring, for a threshold amount of time, in a second direction that is different from a first direction indicated by an articulation control command. The articulation control device may be configured to perform a response action based on determining that articulation motion of the articulated implement is occurring, for the threshold amount of time, in the second direction that is different from the first direction indicated by the articulation control command.

18 Claims, 6 Drawing Sheets

DETECTION OF UNINTENDED DIRECTIONAL MOVEMENT OF AN ARTICULATED IMPLEMENT OF A MACHINE

TECHNICAL FIELD

The present disclosure relates generally to an articulation control device and, more particularly, to detection of unintended directional movement of an articulated implement of a machine, such as a motor grader machine.

BACKGROUND

A motor grader machine may include a transmission coupled to a power source, such as an internal combustion engine or an electric motor to enable the motor grader machine to be repositioned and/or to travel between locations. Additionally, the motor grader machine may include one or more articulated implements to perform one or more functions. For example, the motor grader machine may include a ripper implement to perform a ripping function, a blade implement to perform a blading function, and/or the like.

During movement of the motor grader machine, an articulated implement may be controlled to turn in a direction, such as based on a steering command, based on a manual command, based on an automatic command (e.g., to return to a zero position), and/or the like. For example, when the motor grader machine is turned left (i.e., counter clockwise), wheels of the articulated implement may be controlled to follow the motor grader machine leftward, as described below. An articulation control device may transmit articulation commands to a steering device of the articulated implement based on a input command from another steering device of the motor grader machine. For example, when the motor grader machine receives a input command to turn left (e.g., based on an operator operating a steering wheel), the steering device of the motor grader machine may provide an indication of the input command to turn left to the articulation control device. In this case, the articulation control device may provide a corresponding articulation command to the articulated implement. Further, the articulated implement may cause a left turn, such as by controlling a hydraulic steering system of the articulated implement.

However, in some cases, the articulated implement may move in an unintended direction. For example, when an electronic control unit incorrectly controls the articulated implement, the articulated implement may turn in an unintended rightward direction rather than an intended leftward direction. Additionally, or alternatively, due to a delay in signaling, the motor grader machine may steer leftward at a steering angle, and the articulated implement may steer leftward at an articulation angle that is misaligned to the steering angle. A misalignment between an intended articulation angle of the articulated implement (e.g., based on a steering angle of the motor grader machine) and an actual articulation angle of the articulated implement may result in the motor grader machine and the articulated implement becoming difficult to maneuver and/or control. This may result in collisions, damage to the motor grader machine and/or the articulated implement, damage to a road, and/or the like. Moreover, the motor grader machine may move at a reduced speed as a result of a misalignment of a steering angle of the motor grader machine and an articulation angle of the articulated implement.

One attempt to control steering of an articulated implement is disclosed in U.S. Pat. No. 4,763,916 that issued to Ratsko, et al. on Aug. 16, 1988 ("the '916 patent"). In particular, the '916 patent discloses an "anti jackknifing means [comprising a] controller device being operative to compare the respective angles of steering and articulation with a preprogrammed relationship of steering and articulation angles and for outputting a first signal indicating the existence of an angle of deviation of actual articulation angle from an intended articulation angle for the steering angle and the direction of such angle of deviation . . . said controller device being further operative, in response to the existence of predetermined minimum angle of deviation from intended articulation" to steer an articulated motor vehicle apparatus.

However, while the '916 patent may control an articulated motor vehicle apparatus after deviation of an actual articulation angle from an intended articulation angle by a predetermined minimum angle of deviation, this may result in detection of a temporary deviation. Input commands provided based on detection of a temporary deviation may result in a motor grader device and an articulated implement remaining difficult to control and/or maneuver. Moreover, basing a deviation determination on a "predetermined minimum angle of deviation" may result in a failure to detect deviations of less than a threshold angle for, e.g., more than a threshold period of time, which may result in the motor grader device and articulated implement remaining difficult to control and/or maneuver.

The articulation control device of the present disclosure solves one or more of the problems set forth above and/or other problems in the art.

SUMMARY

According to some implementations, the present disclosure is related to an articulation control device of a machine. The articulation control device may include a memory and one or more processors. The memory and the one or more processors may be configured to receive information identifying an articulation control command for an articulated implement of the machine to move in a first direction. The memory and the one or more processors may be configured to determine, for a threshold quantity of time intervals, that an instantaneous movement value satisfies a movement threshold and that an accumulated movement value indicates that movement of the articulated implement is occurring in a second direction that is different from the first direction. The memory and the one or more processors may be configured to determine that the articulated implement of the machine is moving in an unintended direction based on determining, for the threshold quantity of time intervals, that the instantaneous movement value satisfies the movement threshold and that the accumulated movement value indicates movement in the second direction. The memory and the one or more processors may be configured to perform a response action based on determining that the articulated implement of the machine is moving in the unintended direction.

According to some implementations, the present disclosure is related to a method. The method may include receiving, by a processor, first information identifying an articulation control command for an articulated implement of a machine to move. The method may include determining, by the processor, an instantaneous movement value and an accumulated movement value based on an articulation angle of the articulated implement relative to a body of the machine. The method may include determining, by the processor, that one or more decision criteria are satisfied by the instantaneous movement value and the accumulated movement value, and that a counter value of a counter does not satisfy a counter value threshold. The method may include incrementing, by the processor, the counter value. The method may include resetting, by the processor, the instantaneous movement value. The method may include recalculating, by the processor, the instantaneous movement value and the accumulated movement value based on the articulation angle. The method may include determining, by the processor, that the one or more decision criteria are satisfied by the instantaneous movement value and the accumulated movement value, and that the counter satisfies the counter value threshold. The method may include triggering, by the processor, a response action relating to movement of the articulated implement in an unintended direction based on determining that the one or more decision criteria are satisfied and that the counter satisfies the counter value threshold.

According to some implementations, the present disclosure is related to a motor grader. The motor grader may include an articulated implement and an articulation control device. The articulation control device may be configured to determine that articulation motion of the articulated implement is occurring in a first direction that is different from a second direction indicated by an articulation control command for a threshold amount of time. The articulation control device may be configured to perform a response action based on determining that articulation motion of the articulated implement is occurring in the first direction that is different from the second direction indicated by the articulation control command for the threshold amount of time.

DETAILED DESCRIPTION

This disclosure relates to an articulation control device. The articulation control device has universal applicability to any machine having an articulated implement. Although some implementations described herein relate to a motor grader, the implementations apply equally to other types of machines, such as a vehicle, a tractor, a dozer, or other above ground equipment, underground equipment, or marine equipment. Moreover, one or more implements may be connected to a machine and driven from an articulation control device.

Figure 1A:
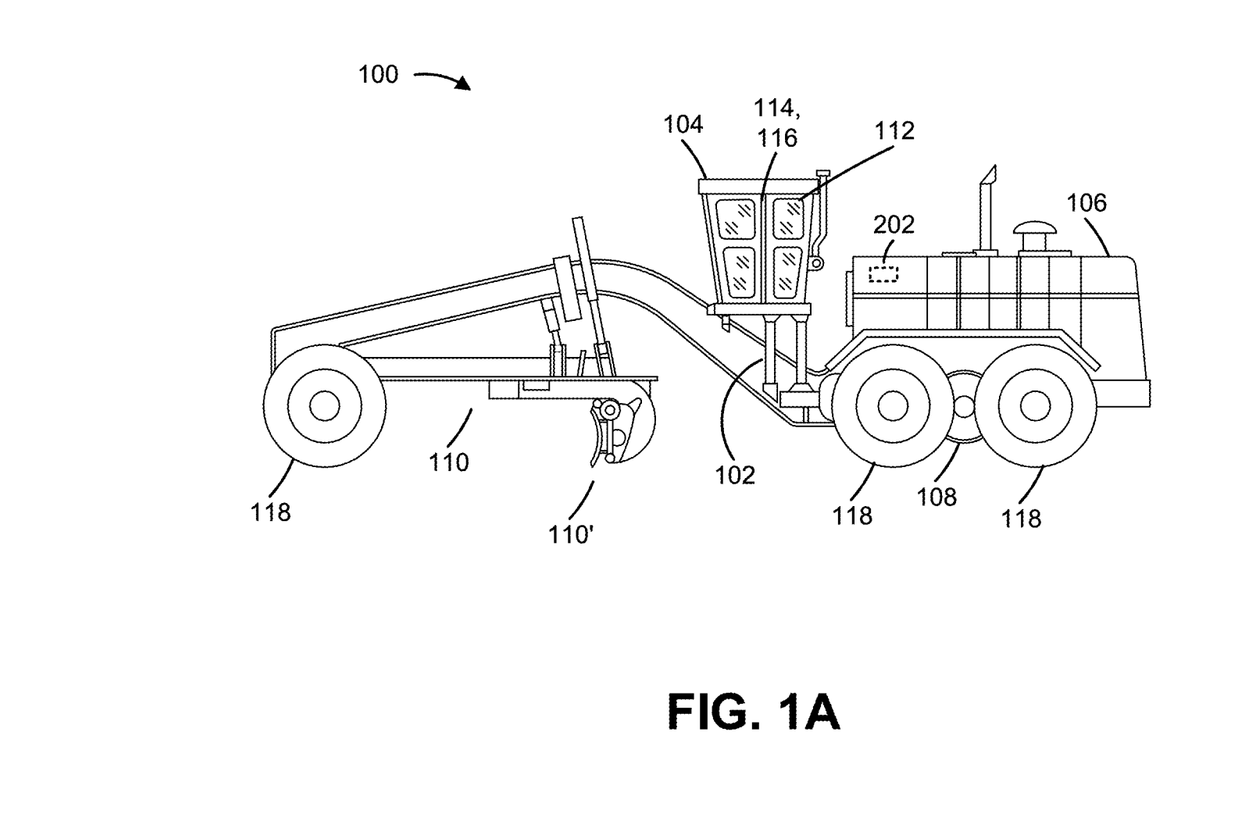
FIGS. 1A and 1B are diagrams of an example machine that includes an articulation control device described herein.
Figure 1B:
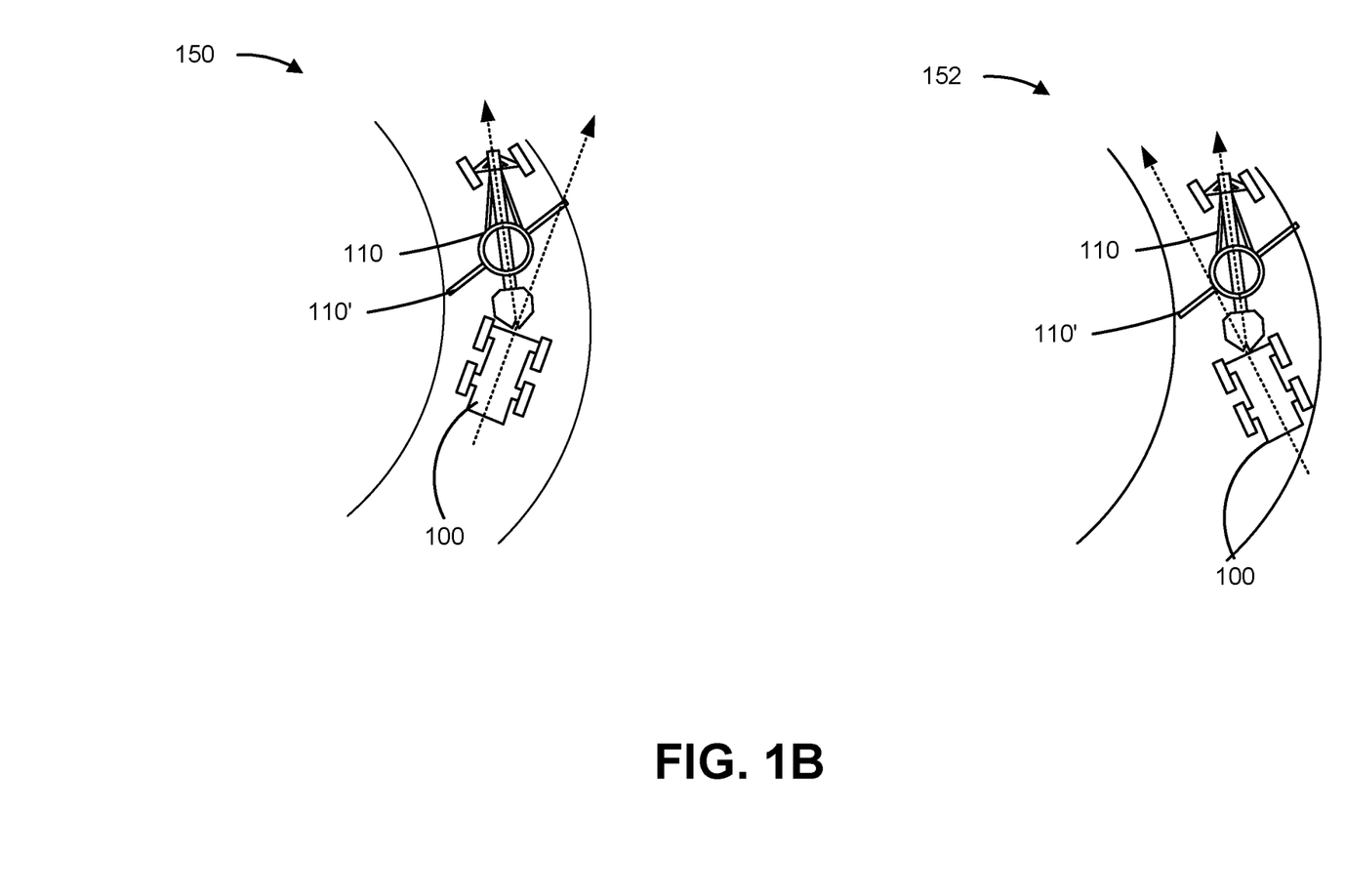

FIGS. 1A and 1B are diagrams of an example machine 100 that includes an articulation control device 202. The machine 100 is shown as a motor grader but may include any type of machine that includes an articulated implement or another type of articulated body.

As shown in FIG. 1A, machine 100 may have a frame 102 that supports an operator station 104, a power system 106, a drive system 108, and an implement 110. The operator station 104 may include operator controls 112 for operating the machine 100 via the power system 106. The illustrated operator station 104 is configured to define an interior cabin 114 within which the operator controls 112 are housed and which is accessible via a door 116.

The power system 106 is configured to supply power to the machine 100. The power system 106 may be operably arranged with the operator station 104 to receive control signals from the operator controls 112 in the operator station 104 and/or the articulation control device 202. Additionally, or alternatively, the power system 106 may be operably arranged with the drive system 108 and/or the implement 110 to selectively operate the drive system 108 and/or the implement 110 according to control signals received from the operator controls 112 and/or the articulation control device 202.

The power system 106 may provide operating power for the propulsion of the drive system 108 and/or the operation of the implement 110. The power system 106 may include an engine and a transmission. The engine may be any type of engine suitable for performing work using the machine 100, such as an internal combustion engine, a diesel engine, a gasoline engine, a gaseous fuel-powered engine, an electric motor, and/or the like. The transmission may transfer power from the engine to the drive system 108 and/or the implement 110. The transmission may provide a number of gear ratios that enable the machine 100 to travel at a relatively wide range of speeds and/or conditions via the drive system 108, and/or that enable the use of the implement 110 to perform work.

The drive system 108 may be operably arranged with the power system 106 to selectively propel the machine 100 in accordance with control signals from the operator controls 112. The drive system 108 can include a plurality of ground-engaging members, such as wheels 118, as shown, which can be movably connected to the frame 102 through axles, drive shafts, and/or other components. In some implementations, the drive system 108 may be provided in the form of a track-drive system, a wheel-drive system, or any other type of drive system configured to propel the machine 100.

The implement 110 may be operably arranged with the power system 106 such that the implement 110 is movable through control signals transmitted from the operator controls 112 and/or the articulation control device 202 to the power system 106. The illustrated implement 110 is a blade 110'. In other words, implement 110 may be a frame onto which is mounted blade 110' and which articulates with respect to machine 100. Other embodiments can include any other suitable implement for a variety of tasks, including, for example, ripping, dozing, brushing, compacting, grading, lifting, loading, plowing, and/or the like. Example implements include rippers, dozers, augers, buckets, breakers/hammers, brushes, compactors, cutters, forked lifting devices, grader bits and end bits, grapples, and/or the like. Although some implementations are described herein in terms of an articulated implement, other articulated bodies are possible, such as another machine coupled to the machine 100 and able to be articulated with respect to the machine 100.

As shown in FIG. 1B, and by reference number 150, in a first scenario, the machine 100 and the implement 110 (and the blade 110' of the implement 110) may be moving with articulation occurring in an intended direction based on a steering angle during a turn. In contrast, as shown by reference number 152, the machine 100 and the implement 100 may be moving with articulation occurring in an unintended direction (e.g., and not based on a steering angle during a turn).

As indicated above, FIGS. 1A and 1B are provided as an example. Other examples are possible and may differ from what is described in connection with FIGS. 1A and 1B.

Figure 2:
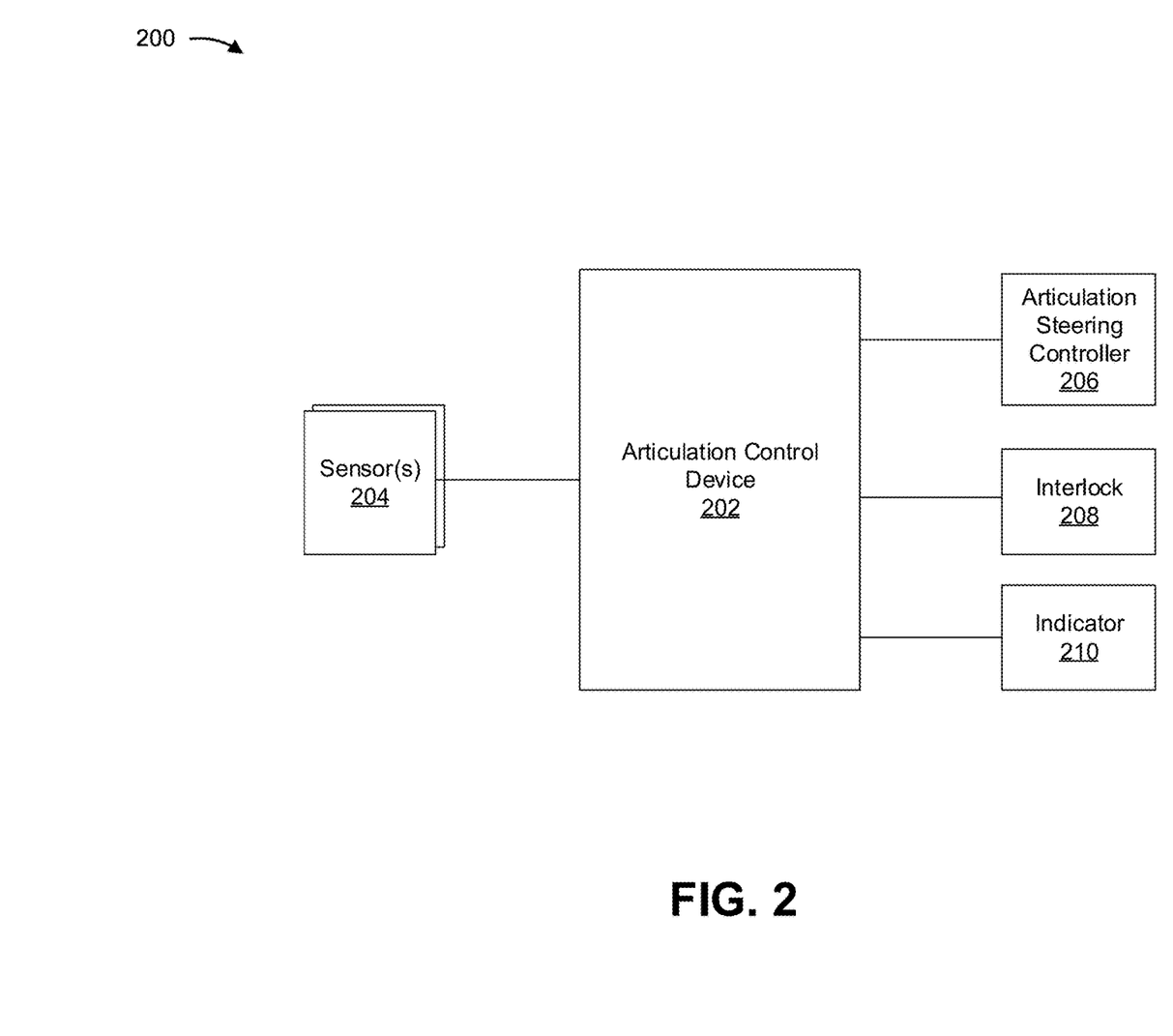
FIG. 2 is a diagram of an example articulation control device described herein.

FIG. 2 is a diagram of an example environment 200 in which systems and/or methods, described herein, may be implemented. As shown in FIG. 2, environment 200 may include the articulation control device 202, one or more sensors 204, an articulation steering controller 206, an interlock 208, and an indicator 210. Devices of environment 200 may interconnect via wired connections, wireless connections, or a combination of wired and wireless connections.

The articulation control device 202 detects motion in an unintended direction by the implement 110 of the machine 100. For example, the articulation control device 202 may be a control device, an electronic control unit, and/or the like of the machine 100. In some implementations, the articulation control device 202 may receive one or more input signals from various components of the machine 100, may operate on the one or more input signals to generate one or more output signals (e.g., by executing a program using the input signals as input to the program), and may output the one or more output signals to various components of the machine 100. For example, the articulation control device 202 may be electronically connected (e.g., via wired or wireless connection) to the one or more sensors 204, the articulation steering controller 206 (e.g., which may correspond to or be in communication with operator controls 112), the interlock 208 (e.g., which may correspond to or be in communication with operator controls 112), the indicator 210 (e.g., which may correspond to or be in communication with operator controls 112), and/or the like, and may receive input from the sensors 204.

Sensors 204 include a set of sensor devices that provide information regarding a status of machine 100. For example, the sensors 204 may include a steering angle sensor, an articulation angle sensor, a timer, and/or the like. In some implementations, a steering angle sensor may provide information indicating an intended steering angle for the machine 100 (e.g., based on operator input), an actual steering angle of the machine 100, and/or the like. Similarly, an articulation angle sensor may provide information indicating an actual articulation angle of the implement 110, an intended articulation angle (e.g., a command being provided to articulation steering controller 206) of the implement 110, and/or the like.

Articulation steering controller 206 includes a control device (e.g., a controller, an actuator, and/or the like) that controls the implement 110. For example, the articulation steering controller 206 may, based on receiving an instruction from the articulation control device 202, alter an angle of the wheels 118 of the implement 110 to cause the implement 110 to move in or toward an intended direction rather than an unintended direction.

Interlock 208 includes a control device (e.g., a controller, an actuator, and/or the like) that controls components of the machine 100. For example, the interlock 208 may lock out a functionality of the machine 100, the implement 110, an engine, a transmission, and/or the like. For example, when the implement is detected to be moving in an unintended direction, the interlock 208 may receive, from articulation control device 202, an instruction to lock out functioning of the implement 110 until the implement 110 is moving in an intended direction in order to avoid damage to the implement 110, to the machine 100, to other machines or persons within a proximity to the machine 100, and/or the like.

Indicator 210 includes a communication device to provide information regarding a status of the articulation control device 202. For example, the indicator 210 may be a light emitting diode to provide information indicating whether the interlock 208 is activated to lock out a particular function of the machine 100. Additionally, or alternatively, the indicator 210 may be a user interface of the machine 100 that provides information indicating whether the implement 110 is moving in an unintended direction, whether a response action is being performed based on the implement 110 moving in an unintended direction, and/or the like.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
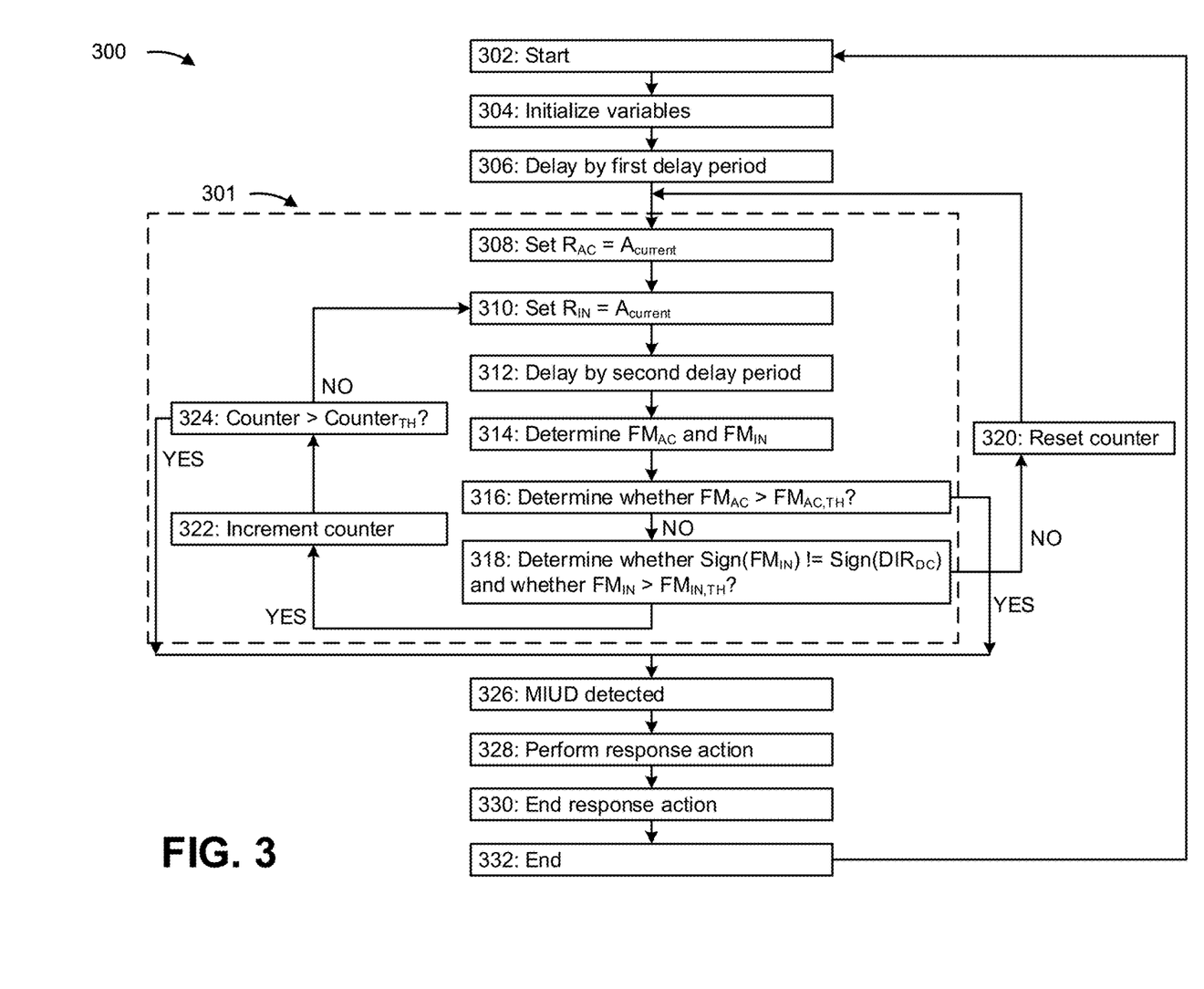
FIG. 3 is a flow chart of an example process for automatically detecting articulation movement in an unintended direction and controlling the articulation movement.

FIG. 3 is a flow chart of an example process 300 for detection and remediation of unintended directional movement by an articulated implement of a machine. In some implementations, one or more process blocks of FIG. 3 may be performed by articulation control device 202. As shown in FIG. 3, process 300 may include a sub-process 301. For example, sub-process 301 may be a debounce procedure to account for transient deviations from an intended directional movement, thereby avoiding control issues associated with attempting to compensate for a transient deviation.

As shown in FIG. 3, process 300 may include starting a procedure for detection and remediation of unintended directional movement by an articulated implement of a machine (block 302). For example, the articulation control device 202 may initiate detection of unintended directional movement by the implement 110 of the machine 100. In some implementations, the articulation control device 202 may initiate detection based on a input command being implemented (e.g., using the operator controls 112), based on determining that the sensor 204 is providing information identifying an articulation angle, based on the implement 110 not being locked out using interlock 208, and/or the like. In some implementations, the articulation control device 202 may determine whether the input command for the machine 100 is non-zero. For example, if the input command (e.g., which may be a steering command from a steering system, a manual command from an operator, an automatic command to return the implement 110 to a zero position, etc.) is zero, the articulation control device 202 may determine that the machine 100 is not turning, and may determine not to detect unintended directional movement by the implement 110 (and may restart process 300 at block 302). Alternatively, if the input command is non-zero, the articulation control device 202 may determine that the machine is turning, and may determine to detect whether unintended directional movement by the implement 110 is occurring (and may proceed in process 300 to block 304). In some implementations, the articulation control device 202 may track the input command during process 300. For example, if the input commands changes from non-zero to zero, the articulation control device 202 may determine that the machine 100 is not turning, and may stop performing process 300. In some implementations, the input command may be a command from a steering device. For example, the input command may be a turn of a steering wheel. Additionally, or alternatively, the input command may be an automatically generated command, a measurement of a direction of movement of the machine 100, and/or the like.

Although some implementations are described herein in terms of control of articulation movement for a non-zero input command, other implementations may enable control of articulation movement for a zero input command (e.g., to avoid a non-zero articulation angle when the input command is a zero input command). In some implementations, the articulation control device 202 may determine the input command based on a sign convention. For example, the articulation control device 202 may represent a left directional input command as a −1 value and a right directional input command as a (+)1 value in a logic.

As shown in FIG. 3, process 300 may include initializing variables (block 304). For example, the articulation control device 202 may set a current articulation angle ($A_{current}$), an instantaneous function movement ($FM_{IN}$), an accumulated function movement ($FM_{AC}$), a counter value, a reference accumulated movement value ($R_{AC}$), a reference instantaneous movement value ($R_{IN}$), and/or the like to an initial value. In this case, the initial value for each variable may be zero. In other cases, another initial value may be used. In some implementations, the current articulation angle may represent an angle of articulation of the implement 110 relative to the machine 100. In some implementations, the instantaneous function movement may represent an amount that the current articulation angle has changed over a period of time, as described herein. Similarly, the accumulated function movement may represent an amount that the current articulation angle has changed over a period of time, as described herein. In some implementations, the counter value represents an amount of iterations of sub-process 301 in which the articulation control device 202 has determined that a particular set of conditions are satisfied. In some implementations, the reference accumulated movement value represents a value of the articulation angle at a reference time (e.g., before a second delay period described herein). In some implementations, the reference instantaneous movement value represents a value of the articulation angle at a reference time, as described herein.

As shown in FIG. 3, process 300 may include delaying by a first delay period (block 304). For example, the articulation control device 202 may delay by a 40 millisecond (ms) delay period to debounce measured parameters. For example, the articulation control device 202 may delay by the 40 ms delay period, and if the input command changes to zero during the delay period, the articulation control device 202 may end process 300 and restart at block 302. In this way, the articulation control device 202 accounts for a transient change to the input command.

As shown in FIG. 3, process 300 may include setting a reference accumulated movement value ($R_{AC}$) to a current articulation angle ($A_{current}$) (block 308). For example, during sub-process 301, the articulation control device 202 may set the reference accumulated movement value to the current articulation angle (e.g., based on information received from the sensor 204). In this way, the articulation control device 202 may store information identifying a value of the articulation angle at a first period of time (e.g., to compare to another value of the articulation angle at a second period of time).

As shown in FIG. 3, process 300 may include setting a reference instantaneous movement value ($R_{IN}$) to a current articulation angle ($A_{current}$) (block 310). For example, during sub-process 301, the articulation control device 202 may set the reference instantaneous movement value to the current articulation angle (e.g., based on information received from the sensor 204). In this way, the articulation control device 202 may store information identifying a value of the articulation angle at a first period of time (e.g., to compare to another value of the articulation angle at a second period of time).

As shown in FIG. 3, process 300 may include delaying by a second delay period (block 312). For example, during sub-process 301, the articulation control device 202 may delay by a 200 ms period to track a change to the current articulation angle. In other words, the articulation control device 202 delays to track whether the current articulation angle is increasing or decreasing relative to the reference instantaneous movement value and/or the reference accumulated movement value. In some implementations, the second delay period may be a set of multiple delay periods. For example, the articulation control device 202 may delay by ten 10 ms periods, and may perform blocks 314 and 316 at a completion of each 10 ms delay period, as described herein. Although some implementations are described herein in terms of particular values for variables (e.g., thresholds, time periods, and/or the like), other values are possible.

As shown in FIG. 3, process 300 may include determining an accumulated function movement and an instantaneous function movement (block 314). For example, during sub-process 301, after the second time period elapses, the articulation control device 202 may set the accumulated function movement as $FM_{AC}=A_{current}-R_{AC}$. In this case, the accumulated function movement represents a difference between the current articulation angle at block 308 and the current articulation angle at block 314 (e.g., a difference in the current articulation angle over a period of time of the second delay period and/or one or more subsequent second delay period that occur without the reference accumulated movement value being re-determined.

Similarly, the articulation control device 202 may set the instantaneous function movement as $FM_{IN}=A_{current}-RF_{IN}$. In this case, the instantaneous function movement represents a difference between the current articulation angle at block 310 and the current articulation angle at block 314 (e.g., a difference in the current articulation angle of a period of time of the second delay period). As a contrast, based on the reference accumulated movement value not being reset each time the counter is incremented and the instantaneous movement value being reset each time the counter is incremented, as described herein, the accumulated function movement may increase based on a change to the articulation angle over multiple second delay periods whereas the instantaneous function movement represents the change to the articulation angle over a single second delay period.

As shown in FIG. 3, process 300 may include determining whether the accumulated function movement satisfies an accumulated function movement threshold (block 316). For example, during sub-process 301, the articulation control device 202 may determine whether a total change to the articulation angle, relative to an initial value of the articulation angle at block 308, satisfies a threshold. In this case, the threshold may be, for example, 3.5 degrees. Based on determining that the accumulated function movement satisfies the accumulated function movement threshold, the articulation control device 202 may determine that the articulation angle has changed by such a magnitude as to immediately determine that motion in an unintended direction is occurring (block 326) rather than tracking to determine that a threshold quantity of time intervals include movement in the unintended direction, as described herein with regard to blocks 318 through 324.

As shown in FIG. 3, based on the accumulated function movement not satisfying the accumulated movement threshold (block 316—NO), process 300 may include determining whether a sign of an instantaneous movement function ($FM_{IN}$) is different than a sign of as the input command ($DIR_{DC}$) and whether the instantaneous movement function is greater than an angle threshold ($FM_{IN,TH}$) (block 318). For example, during sub-process 301, the articulation control device 202 may determine whether a sign of the instantaneous function movement is different than a sign of the input command, and whether the instantaneous movement function is greater than the angle threshold. In this case, if the signs are different and the instantaneous function movement is greater than the angle threshold (e.g., a threshold articulation angle), articulation control device 202 may determine that movement is occurring in an unintended direction for a particular time period, and may increment a counter (block 322). In contrast, if the signs are the same or the instantaneous movement function is not greater than the angle threshold, articulation control device 202 may determine that movement is occurring in the intended direction or that movement is occurring in the unintended direction at less than a threshold rate, and the articulation control device 202 may reset the counter (block 320).

As shown in FIG. 3, based on the articulation control device 202 determining that the signs are the same or the instantaneous function movement is not greater than the angle threshold (block 318—NO), process 300 may include resetting the counter (block 320). For example, the articulation control device 202 may reset the counter, and may restart sub-process 301.

As shown in FIG. 3, based on the articulation control device determining that the sign of the instantaneous function movement and the input command are different and that the instantaneous function movement is greater than a threshold value (block 318—YES) process 300 may include incrementing a counter (block 322). For example, during sub-process 301, the articulation control device 202 may increment the counter value. In this way, the articulation control device 202 detects movement of the implement 110 in an unintended direction, and increments the counter to enable a determination of whether the movement in the unintended direction has occurred for a threshold quantity of time periods.

As shown in FIG. 3, process 300 may include determining whether the counter exceeds a threshold (e.g., $Counter_{TH}$) (block 324). For example, during sub-process 301, the articulation control device 202 may determine whether the counter exceeds the threshold indicating that motion in an unintended direction has been detected for a threshold quantity of time intervals. In this case, based on the counter not exceeding the threshold, articulation control device 202 may reset the reference instantaneous movement value (block 310), delay by another second delay period (block 312), and/or the like, as described above. Alternatively, based on the counter exceeding the threshold, articulation control device 202 may classify observed motion as motion occurring in the unintended direction for the implement 110 (block 326). In other words, the articulation control device 202 may use the sub-process 301 to determine whether to classify articulation motion as motion in the unintended direction that is to be mitigated, or whether to classify the articulation motion as transient articulation motion that is not to be mitigated.

As shown in FIG. 3, process 300 may include determining that motion in an unintended direction (MIUD) has been detected for the articulated implement (block 326). For example, based on determining that the counter exceeds the counter threshold or based on determining that the accumulated function movement satisfies an accumulated function movement threshold, articulation control device 202 may determine that motion is occurring in the unintended direction for the implement 110.

As shown in FIG. 3, process 300 may include performing a response action (block 328). For example, the articulation control device 202 may set an alert, lock out a function of the machine 100 or the implement 110, automatically transmit a control signal to control a direction of the implement 110 and/or the machine 100, and/or the like.

As shown in FIG. 3, process 300 may include ending the response action (block 330). For example, the articulation control device 202 may determine that a condition relating to the implement 110 is altered (e.g., movement is occurring in an intended direction, an articulation angle is less than a threshold, and/or the like), and may end performance of the response action.

As shown in FIG. 3, process 300 may end (block 332). For example, the articulation control device 202 may end process 300, and may restart process 300, as described above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
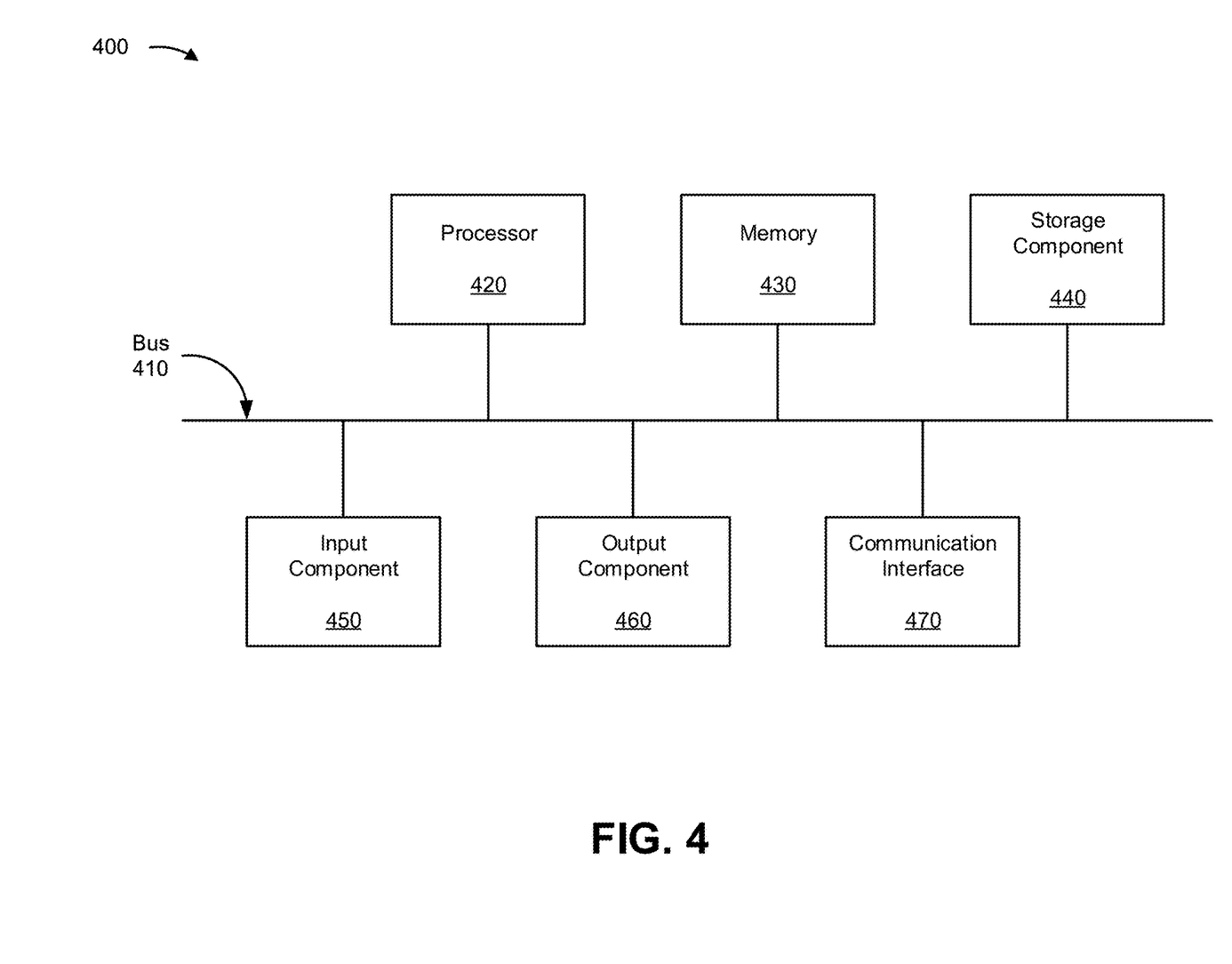
FIG. 4 is a diagram of example components of one or more systems and/or devices described herein.

FIG. 4 is a diagram of example components of a device 400. Device 400 may correspond to articulation control device 202, sensor 204, articulation steering controller 206, interlock 208, and/or indicator 210. In some implementations, articulation control device 202, sensor 204, articulation steering controller 206, interlock 208, and/or indicator 210 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
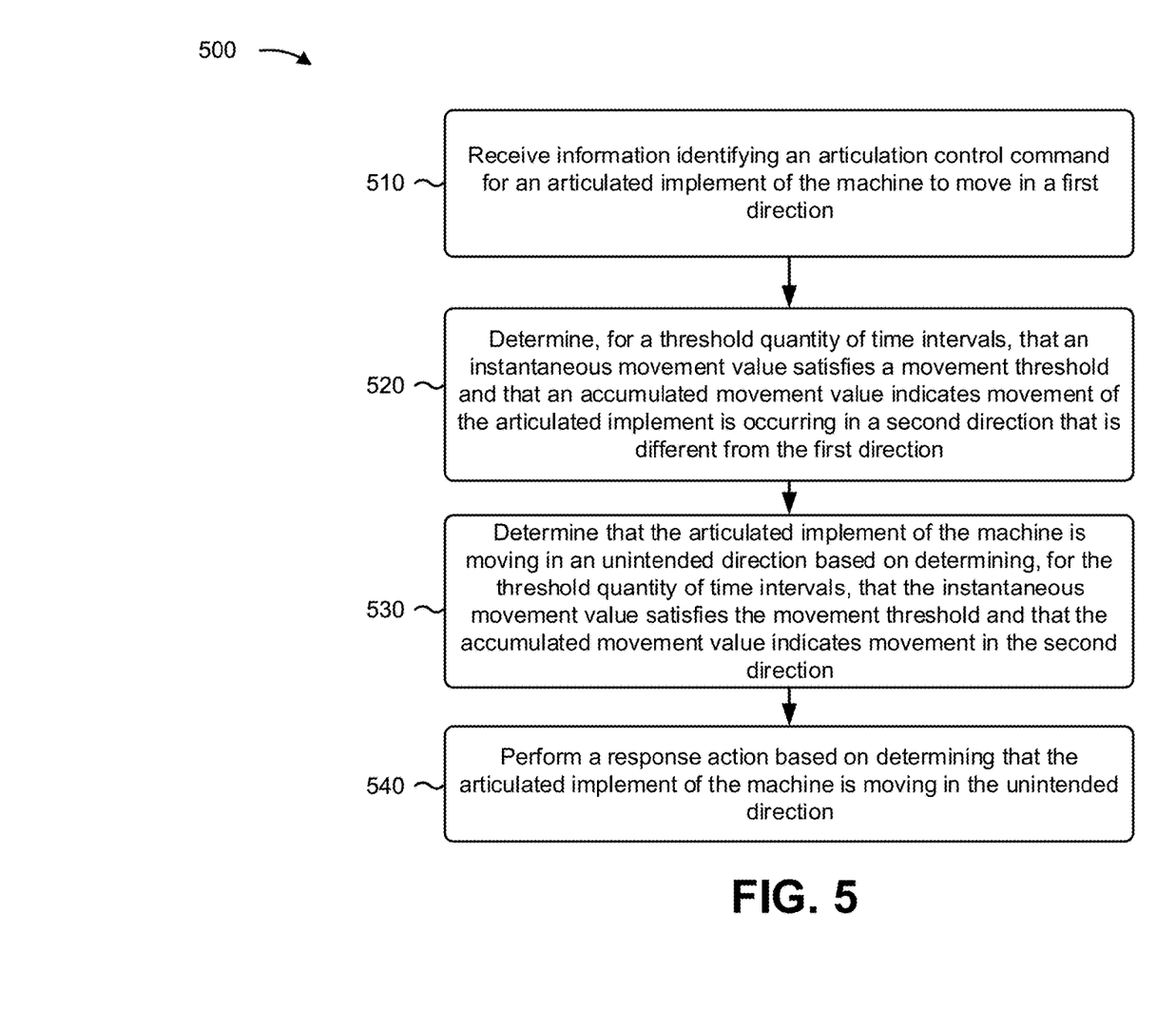
FIG. 5 is a flow chart of an example process for automatically detecting articulation movement in an unintended direction and controlling the articulation movement.

FIG. 5 is a flow chart of an example process 500 for detection of unintended directional movement of an articulated implement of a machine. In some implementations, one or more process blocks of FIG. 5 may be performed by an articulation control device. In some implementations, one or more process blocks of FIG. 5 may be performed by another device or a group of devices separate from or including the articulation control device (e.g., articulation control device 202).

As shown in FIG. 5, process 500 may include receiving information identifying an articulation control command for an articulated implement of the machine to move in a first direction (block 510). For example, the articulation control device (e.g., using processor 420, input component 450, communication interface 470, and/or the like) may receive information identifying an articulation control command for an articulated implement of the machine to move in a first direction, as described above.

As further shown in FIG. 5, process 500 may include determining, for a threshold quantity of time intervals, that an instantaneous movement value satisfies a movement threshold and that an accumulated movement value indicates that movement of the articulated implement is occurring in a second direction that is different from the first direction (block 520). For example, the articulation control device (e.g., using processor 420 and/or the like) may determine, for a threshold quantity of time intervals, that an instantaneous movement value satisfies a movement threshold and that an accumulated movement value indicates that movement of the articulated implement is occurring in a second direction that is different from the first direction, as described above. In some implementations, the instantaneous movement value is reset and recalculated in each time interval of the threshold quantity of time intervals, and the accumulated movement value is accumulated across each time interval of the threshold quantity of time intervals.

As further shown in FIG. 5, process 500 may include determining that the articulated implement of the machine is moving in an unintended direction based on determining, for the threshold quantity of time intervals, that the instantaneous movement value satisfies the movement threshold and that the accumulated movement value indicates movement in the second direction (block 530). For example, the articulation control device (e.g., using processor 420 and/or the like) may determine that the articulated implement of the machine is moving in an unintended direction based on determining, for the threshold quantity of time intervals, that the instantaneous movement value satisfies the movement threshold and that the accumulated movement value indicates movement in the second direction, as described above.

As further shown in FIG. 5, process 500 may include performing a response action based on determining that the articulated implement of the machine is moving in the unintended direction (block 540). For example, the articulation control device (e.g., using processor 420, output component 460, communication interface 470, and/or the like) may perform a response action based on determining that the articulated implement of the machine is moving in the unintended direction, as described above.

Process 500 may include additional implementations, such as any single implementation or any combination of implementations described below and/or in connection with one or more other processes described elsewhere herein.

In some implementations, the instantaneous movement value is reset and recalculated in each time interval of the threshold quantity of time intervals, and the accumulated movement value is accumulated across each time interval of the threshold quantity of time intervals. In some implementations, process 500 may include triggering an alert indicating that the articulated implement of the machine is moving in the unintended direction. In some implementations, process 500 may include detecting, after starting performance of the response action, a change to the articulation control command, and ending or otherwise modifying performance of the response action based on detecting the change to the articulation control command. In some implementations, process 500 may include causing an alteration to an articulation angle of the articulation implement.

In some implementations, process 500 may include transmitting a lock out command to lock out a function of the machine. In some implementations, the accumulated movement value accumulates from a detection of the articulated implement of the machine moving in the second direction. In some implementations, process 500 may include setting a counter to track a quantity of time intervals in which the instantaneous movement value satisfies the movement threshold and the accumulated movement value indicates movement of the articulated implement in the second direction, and determining that the articulated implement of the machine is moving in the unintended direction based on the counter satisfying a counter threshold.

In some implementations, process 500 may include incrementing the counter based on determining that the instantaneous movement value, in a particular time interval, of the threshold quantity of time intervals, satisfies the movement threshold and that the accumulated movement value indicates that movement of the articulated implement is occurring in the second direction, and determining that the counter has satisfied the counter threshold based on incrementing the counter. In some implementations, process 500 may include determining, during another time interval not included in the threshold quantity of time intervals, that the instantaneous movement value does not satisfy the movement threshold or that the accumulated movement value does not indicate movement in the second direction, and resetting the counter.

Additionally, or alternatively, a process may include receiving, by a processor, first information identifying an articulation control command for an articulated implement of a machine to move. Such a process may include determining, by the processor, an instantaneous movement value and an accumulated movement value based on an articulation angle of the articulated implement relative to a body of the machine. Such a process may include determining, by the processor, that one or more decision criteria are satisfied by the instantaneous movement value and the accumulated movement value, and that a counter value of a counter does not satisfy a counter value threshold. Such a process may include incrementing, by the processor, the counter value. Such a process may include resetting, by the processor, the instantaneous movement value. Such a process may include recalculating, by the processor, the instantaneous movement value and the accumulated movement value based on the articulation angle. Such a process may include determining, by the processor, that the one or more decision criteria are satisfied by the instantaneous movement value and the accumulated movement value, and that the counter satisfies the counter value threshold. Such a process may include triggering, by the processor, a response action relating to movement of the articulated implement in an unintended direction based on determining that the one or more decision criteria are satisfied and that the counter satisfies the counter value threshold.

Such a process may include additional implementations, such as any single implementation or any combination of implementations described below and/or in connection with one or more other processes described elsewhere herein.

In some implementations, the one or more decision criteria relate to the instantaneous movement value, and the accumulated movement value indicates movement in the unintended direction. In some implementations, the unintended direction is associated with a direction different from a direction of the articulation control command. In some implementations, such a process may include determining that the articulation control command is altered, and resetting the counter. In some implementations, the articulation control command is altered to zero. In some implementations, the articulation control command is altered to lock out articulation.

Additionally, or alternatively, a process may include determining that articulation motion of the articulated implement is occurring in a first direction that is different from a second direction indicated by an articulation control command for a threshold amount of time. Such a process may include performing a response action based on determining that articulation motion of the articulated implement is occurring in the first direction that is different from the second direction indicated by the articulation control command for the threshold amount of time.

Such a process may include additional implementations, such as any single implementation or any combination of implementations described below and/or in connection with one or more other processes described elsewhere herein.

Such a process may include determining that articulation motion in the first direction satisfies a threshold amount of motion, and performing the response action based on determining that the articulation motion in the first direction satisfies the threshold amount of motion. In some implementations, the threshold amount of time is a threshold quantity of consecutive time intervals at which the articulation motion of the articulated implement is compared with the articulation control command. In some implementations, a sensor may be provided to determine a steering direction applied to the motor grader and to determine the articulation control command based on the steering direction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed articulation control device (e.g., the articulation control device 202) may be used with any machine where a technique for detecting motion in an unintended direction is needed. The disclosed articulation control device may perform an analysis of data identifying an intended direction of motion of a machine, an articulation control command, an articulation angle of an articulated implement of the machine, and/or the like, and may determine whether motion of the articulated implement is occurring in an unintended direction. In this case, the articulation control device may determine that motion is occurring in the unintended direction based on determining, for a threshold quantity of time intervals, that an instantaneous movement value satisfies a threshold and that an accumulated movement value indicates movement of the articulated implement is occurring in a different direction than the articulation control command.

In addition, the articulation control device may trigger an alert for an operator, lock out a function of the articulated implement or the machine, automatically control the articulated implement or the machine, and/or the like based on determining motion in the unintended direction. Particularly, the articulation control device may perform these actions in the context of moving the machine and/or the articulated implement. As such, the articulation control device may be capable of improving controllability and/or maneuverability of the machine and/or the articulated implement. This minimizes a likelihood of damage to the machine, the articulated implement, a pedestrian, another machine or vehicle, and/or the like. In addition, this reduces costs associated with maintaining a machine that includes the articulated implement by, for example, reducing wear on the machine and/or the articulated implement. Further, this may improve a speed of the machine by reducing a likelihood of a misalignment between the machine and the articulated implement when the machine is turning.

What is claimed is:

1. An articulation control device of a machine, comprising:
    a memory; and
    one or more processors configured to:
        receive information identifying an articulation control command for an articulated implement of the machine to move in a first direction;
        set a counter to track a quantity of time intervals in which an instantaneous movement value satisfies a movement threshold and an accumulated movement value indicates movement of the articulated implement is occurring in a second direction that is different from the first direction;
        determine that the articulated implement of the machine is moving in an unintended direction based on the counter;
        perform a response action based on determining that the articulated implement of the machine is moving in the unintended direction;
        determine that the articulation control command is altered; and
        reset the counter.

2. The articulation control device of claim 1, wherein the instantaneous movement value is reset and recalculated in each time interval of the threshold quantity of time intervals, and the accumulated movement value is accumulated across each time interval of the quantity of time intervals.

3. The articulation control device of claim 1, wherein the one or more processors, when performing the response action, are to:
    trigger an alert indicating that the articulated implement of the machine is moving in the unintended direction.

4. The articulation control device of claim 1, wherein the one or more processors are further to:
    alter performance of the response action based on determining that the articulation control command is altered.

5. The articulation control device of claim 1, wherein the one or more processors, when performing the response action, are to:
    cause an alteration to an articulation angle of the articulation implement.

6. The articulation control device of claim 1, wherein the accumulated movement value accumulates from a time of detection of the articulated implement of the machine moving in the second direction.

7. The articulation control device of claim 1,
    wherein the one or more processors, when determining that the articulated implement of the machine is moving in the unintended direction, are to:
        determine that the articulated implement of the machine is moving in the unintended direction based on the counter satisfying a counter threshold.

8. The articulation control device of claim 1, wherein the one or more processors are further to:
    increment the counter based on determining that the instantaneous movement value, in a particular time interval, of the quantity of time intervals, satisfies the movement threshold and that the accumulated movement value indicates that movement of the articulated implement is occurring in the second direction.

9. The articulation control device of claim 1, wherein the one or more processors are further to:
    determine, during another time interval not included in the quantity of time intervals, that the instantaneous movement value does not satisfy the movement threshold or that the accumulated movement value does not indicate movement in the second direction; and
    reset the counter.

10. A method, comprising:
    receiving, by a processor, first information identifying an articulation control command for an articulated implement of a machine to move;
    determining, by the processor, an instantaneous movement value and an accumulated movement value based on an articulation angle of the articulated implement relative to a body of the machine;
    determining, by the processor, that one or more decision criteria are satisfied by the instantaneous movement value and the accumulated movement value and that a counter value of a counter does not satisfy a counter value threshold;
    incrementing, by the processor, the counter value;
    resetting, by the processor, the instantaneous movement value;
    recalculating, by the processor, the instantaneous movement value and the accumulated movement value based on the articulation angle;
    determining, by the processor, that the one or more decision criteria are satisfied by the instantaneous movement value and the accumulated movement value, and that the counter satisfies the counter value threshold;
    triggering, by the processor, a response action relating to movement of the articulated implement in an unintended direction based on determining that the one or more decision criteria are satisfied and that the counter satisfies the counter value threshold;
    determining, by the processor, that the articulation control command is altered; and
    resetting, by the processor, the counter.

11. The method of claim 10, wherein the one or more decision criteria relate to the instantaneous movement value, and the accumulated movement value indicates movement in the unintended direction.

12. The method of claim 10, wherein the unintended direction is associated with a direction different from a direction of the articulation control command.

13. The method of claim 10, wherein the articulation control command is altered to zero.

14. A motor grader, comprising:
    an articulated implement; and
    an articulation control device configured to:
        determine that a counter, to track a quantity of time intervals in which articulation motion of the articulated implement is occurring in a first direction that is different from a second direction indicated by an articulation control command, satisfies a counter threshold;
        perform a response action based on determining that the counter satisfies a counter threshold;
        detect that the articulation control command is altered; and
        reset the counter.

15. The motor grader of claim 14, wherein the articulation control device is further configured to:
    determine that articulation motion in the first direction satisfies a threshold amount of motion; and perform the response action based on determining that the articulation motion in the first direction satisfies the threshold amount of motion.

16. The motor grader of claim 14, wherein the quantity of time intervals are consecutive time intervals at which the articulation motion of the articulated implement is compared with the articulation control command.

17. The motor grader of claim 14, further comprising:
a sensor to determine an input command to determine the articulation control command based on the input command.

18. The motor grader of claim 14,
wherein the articulation control device is further configured to:
determine that the articulated implement is moving in an unintended direction based on determining that the counter satisfies the counter threshold, and
wherein, when performing the response action, the articulation control device is configured to:
perform the response action based on determining that the articulated implement is moving in the unintended direction.

* * * * *